United States Patent [19]

Maldavs

[11] 4,181,150

[45] Jan. 1, 1980

[54] LEVER-TYPE QUICK DISCONNECT COUPLING

[75] Inventor: Ojars Maldavs, Lincoln, Nebr.

[73] Assignee: Gould, Inc., Rolling Meadows, Ill.

[21] Appl. No.: 832,182

[22] Filed: Sep. 12, 1977

[51] Int. Cl.² ............................................. F16L 37/22
[52] U.S. Cl. ............................ 137/614.06; 251/149.9
[58] Field of Search .............. 137/614, 614.01, 614.04, 137/614.06; 251/253, 252, 149.9, 89.5; 285/312, 316, 320

[56] References Cited

U.S. PATENT DOCUMENTS

| | | | |
|---|---|---|---|
| 3,130,749 | 4/1964 | Wittren | 137/614 |
| 3,166,343 | 1/1965 | Wittren | 285/1 |
| 3,680,591 | 5/1970 | Vik | 137/614.05 |
| 3,710,823 | 1/1973 | Vik | 137/614.06 |
| 3,791,411 | 2/1974 | Bogeskov et al. | 285/177 |
| 3,809,122 | 5/1974 | Berg | 251/149.9 |
| 4,074,698 | 2/1978 | Hobson et al. | 137/614.06 |

*Primary Examiner*—Martin P. Schwadron
*Assistant Examiner*—A. Michael Chambers

[57] ABSTRACT

A lever-type quick disconnect female coupling for co-action with a check-valve equipped male coupling is provided with a movable valve member which functions both as a sealing valve for the female coupling and a push member for opening the check valve of the male coupling.

7 Claims, 8 Drawing Figures

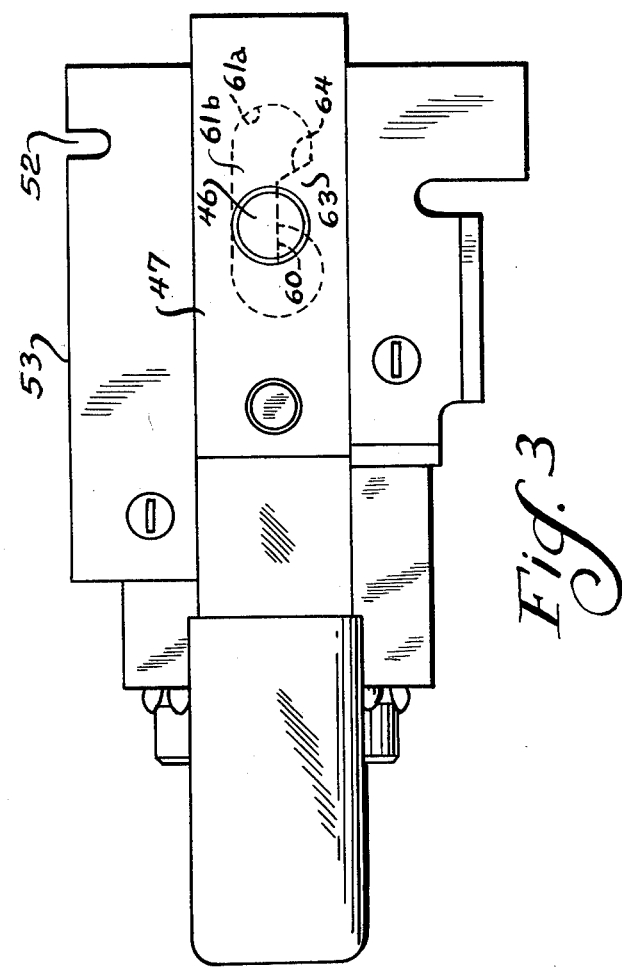
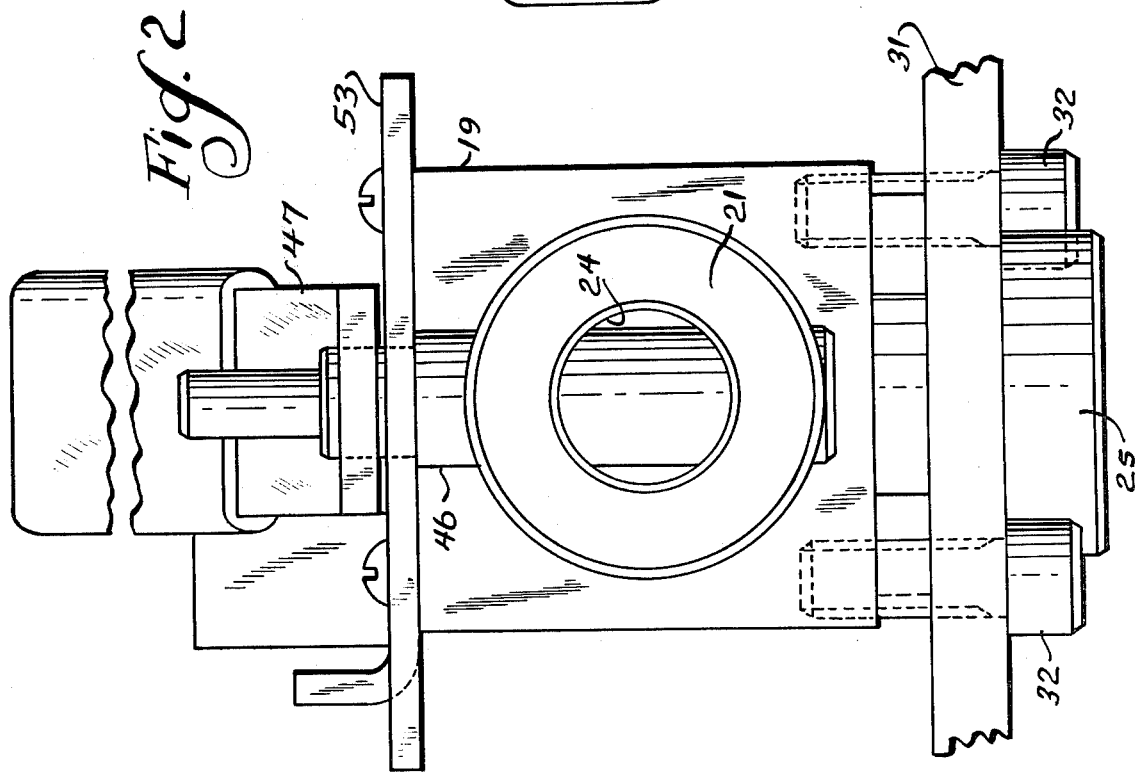

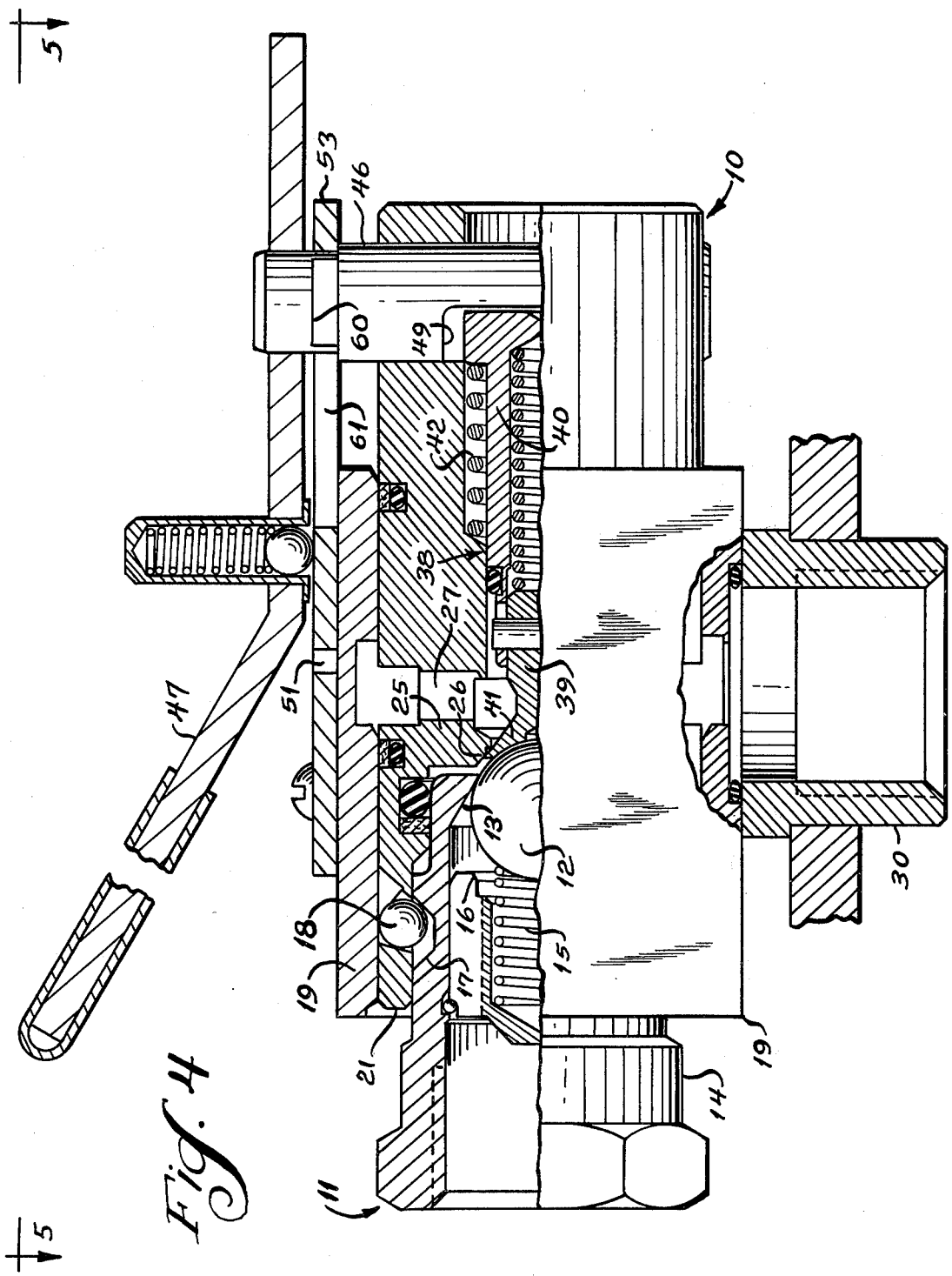

LEVER-TYPE QUICK DISCONNECT COUPLING

BACKGROUND AND SUMMARY OF THE INVENTION

This invention relates to a quick disconnect coupling, and, more particularly, to a quick disconnect coupling having a lever-operated valve.

Quick disconnect couplings are frequently used to connect hydraulic hoses for conveying pressurized hydraulic fluid. For example, agricultural tractors frequently include hydraulic hoses which connect the hydraulic system of the tractor to an agricultural implement. Normally, the female coupling is on the tractor, and the male coupling is on the hydraulic hose of the implement.

Quick disconnect male and female hydraulic couplings usually include valves which seal the couplings when disconnected to prevent leakage of pressurized hydraulic fluid. However, "conventional" quick disconnect couplings cannot be connected and disconnected when the couplings are pressurized by the hydraulic fluid. Lever-type quick disconnect couplings were developed to overcome this problem, and lever-type quick disconnect couplings can be connected and disconnected even when pressurized.

However, prior art lever-type quick disconnect couplings have suffered from one or more disadvantages. For example, a relatively large space usually exists between the valves of the male and female couplings, and the relatively large volume of hydraulic fluid which occupies this space between the valves is spilled each time the couplings are disconnected. A corresponding problem arises from the long turbulent flow passages through these couplings, which causes a high pressure drop. Pressure drop is also caused by the cam mechanism operated by the lever if the cam mechanism is located in the flow passage. Still another cause of high pressure drop is excessive tolerance accumulation on the valving and cam members. The valving is able to "float" by the amount of accumulated clearances between the various parts. Another problem experienced with some lever-type quick disconnect couplings is excessive lever force caused by large piston diameters in relation to the available mechanical advantages, and excessive valve travel distance.

The invention overcomes the foregoing problems by utilizing a unique valve which is movable within the female coupling to seal the female coupling and to open the valve member of the male coupling. The valve is contoured to fit the valve member of the male coupling and minimizes the volume between the two valves, thereby minimizing fluid spillage during disconnect. Pressure drop is maintained at a low level by locating the cam mechanism for operating the valve outside of the flow passage and by keeping the flow passage very short. Pressure drop is also minimized because the valve holds the valve member of the male coupling fully open while adjusting for tolerance accumulation and eliminating clearances between valving members.

Other objects and advantages of the invention may be seen in the details of the ensuing specification.

DETAILED DESCRIPTION

The invention is described in conjunction with an illustrative embodiment in the accompanying drawing, in which--

FIG. 2 is an end view of the female coupling device of FIG. 1 taken along the line 2—2 of FIG. 1;

FIG. 3 is a top view of the female coupling device taken along the line 3—3 of FIG. 1;

FIG. 4 is a view similar to FIG. 1 showing the male coupling and the female coupling in their coupled position with the valves thereof closed;

Figure 1:
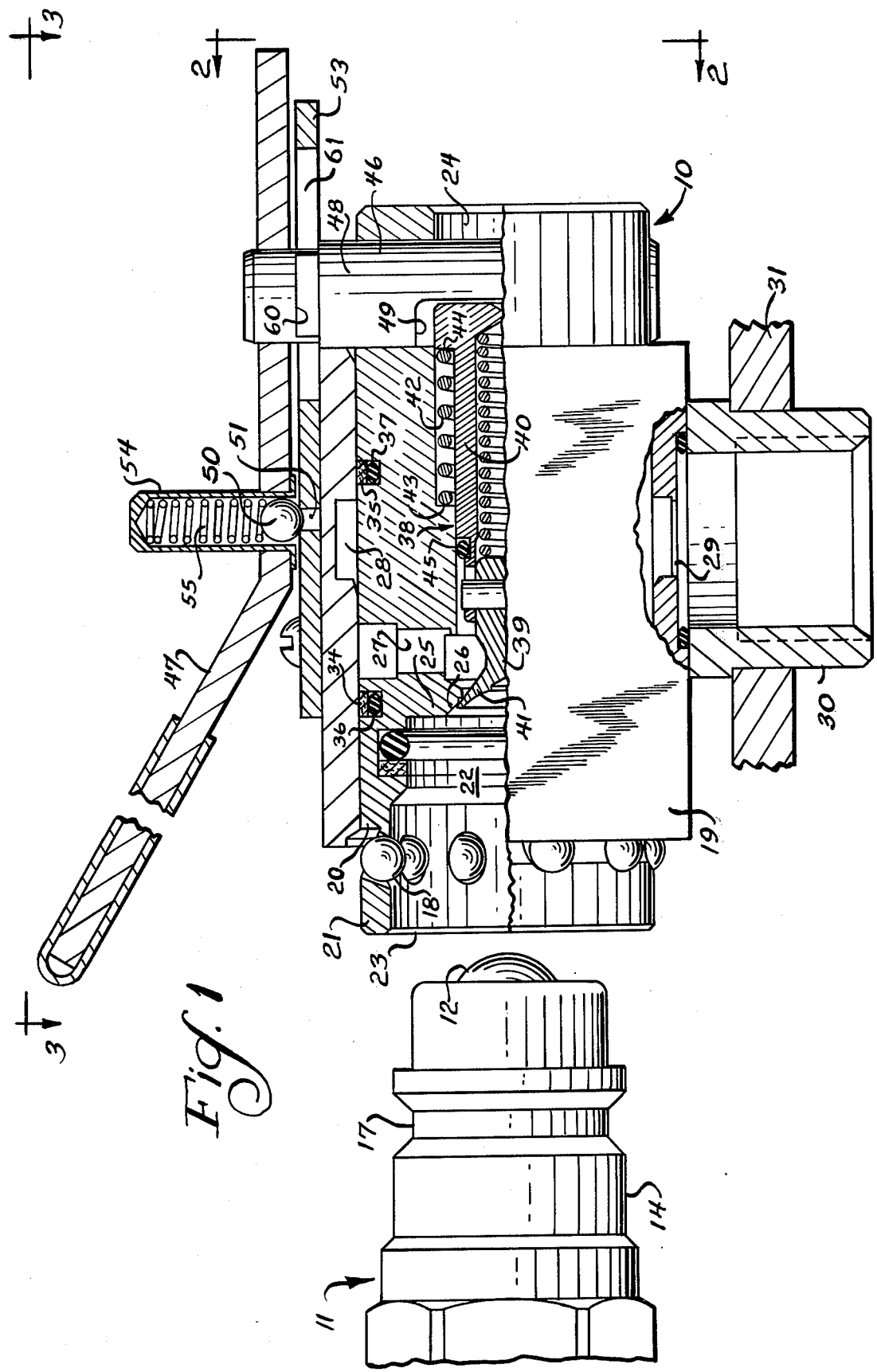
FIG. 1 is an elevational view, partially in section, of the inventive coupling device and also showing to the left thereof a conventional male coupling half.

In the illustration given, and with reference first to FIG. 1, the numeral 10 designates generally the inventive female quick disconnect coupling and the numeral 11 designates generally a conventional male quick disconnect coupling. The male coupling 11 includes the conventional ball check valve 12 resiliently urged against a seat 13 (see FIG. 4) provided within a generally cylindrical casing 14. The ball is urged against the seat by a spring 15, and rearward travel of the ball beyond its fully open position is prevented by a stop 16. Referring again to FIG. 1, the casing 14 is equipped with a conventional groove 17 which receives the lock balls 18 provided with the female coupling 10. Alternatively, the male coupling 11 may be equipped with a poppet check valve rather than the ball check valve shown.

The female coupling 10 includes an outer housing 19 which is equipped with an axially extending circular bore 20. A generally cylindrical inner tubular housing or body 21 is axially slidably mounted within the bore 20 of the housing 19 and is provided with a central bore 22 having an open forward end 23 and a rear end 24.

The tubular body 21 includes a radially inwardly extending shoulder 25 which provides a valve seat 26, and a plurality of radial passages 37 extend outwardly from the bore of the tubular body behind the valve seat. As will be explained more fully hereinafter, the tubular body 21 is slidable axially within the housing 19 from a first position illustrated in FIG. 1 to a second position illustrated in FIG. 4 in which the radial openings 27 in the tubular body are axially aligned with an annular groove 28 in the housing. The groove communicates with a port 29 through the housing and a connector or nipple 30 for connecting the female coupling to the hydraulic system of a tractor or the like. A mounting plate 31 is attached to the housing 19 by bolts 32 (FIG. 2) for mounting the female coupling on a tractor. Leakage between the tubular body 21 and the housing 19 is prevented by a pair of annular gaskets 34 and 35 which are pressed against the housing by O-rings 36 and 37.

A valve assembly 38 is axially slidably mounted within the bore 22 of the tubular housing 21 and includes a valve 39 and a tubular valve actuator 40 in which the valve 39 is mounted. The valve 39 includes a generally conical sealing portion 41 which sealingly engages the valve seat 26 in FIG. 1 and which has a forward face contoured to engage the movable valve member of the male coupling 11. In the particular embodiment illustrated, the male coupling includes a ball valve, and the forward face of the conical portion 41 of the valve 39 has a spherical contour for engaging the ball. The valve assembly is resiliently biased to the right in FIG. 1 to seat the valve 39 against the valve seat 26 by a coil spring 42 which is ensleeved on the actuator 40 between shoulders 43 and 44 on the tubular body and the actuator, respectively. Leakage of fluid into the annular space occupied by the spring is prevented by an O-ring 45 carried by the actuator.

Figure 6:
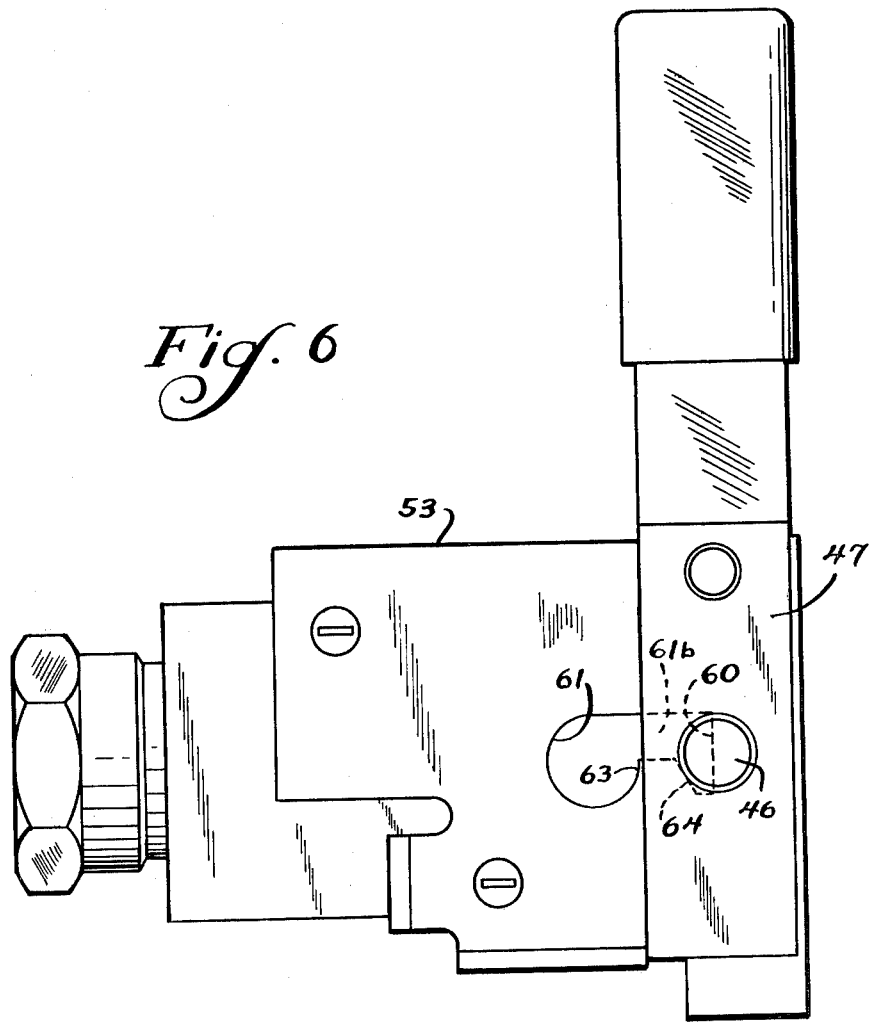
FIG. 6 is a fragmentary top view similar to FIG. 5 showing the lever moved to open the valves.
Figure 7:
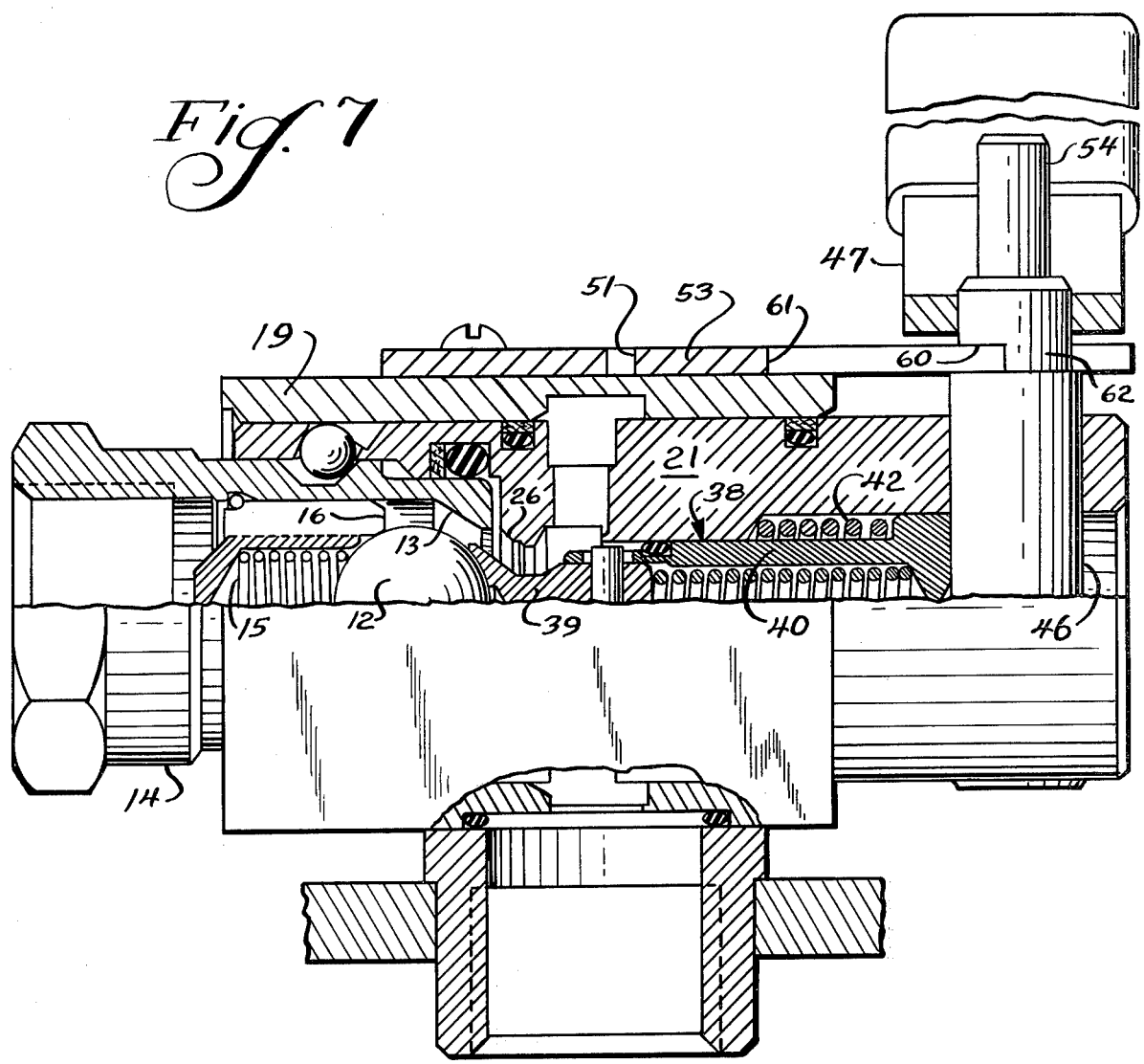
FIG. 7 is a view similar to FIG. 4 showing the valves opened.

The valve assembly 38 is movable from its sealing position illustrated in FIG. 1 to an open position illustrated in FIG. 7 by a cam 46 which is operated by a lever 47. The cam 46 is provided by a generally cylindrical rod 48 which is rotatably mounted in the rear end of the tubular body 21 and which is provided with a recess 49 into which the actuator of the valve assembly is forced by the coil spring 42. The lever 47 is non-rotatably connected to the upper end of the cam, and rotation of the lever from the position illustrated in FIGS. 1 and 3 to the position illustrated in FIGS. 6 and 7 rotates the recess 49 of the cam out of alignment with the actuator and forces the actuator to the left against the bias of the coil spring 42.

The lever 47 is detented in its two positions by a detent ball 50 which is engageable with a hole 51 in the first position and a slot 52 (FIG. 3) in the second position. The hole 51 and slot 52 are provided in a plate 53 which is mounted on the housing. The detent ball is confined within a tubular housing 54 and is urged against the plate 53 by a spring 55.

OPERATION

The operation of the inventive coupling is apparent from FIGS. 1, 4, and 7. In FIG. 1, the valve 39 engages the valve seat 26 and prevents flow of fluid through the female coupling.

FIG. 4 illustrates the female coupling 10 and the male coupling 11 in the coupled position. As the male coupling is moved into the open end of the tubular body 21 of the female coupling, the locking balls 18 are forced radially outwardly until they fall into the groove 17 in the male coupling. Further rightward movement of the male coupling into the female coupling forces the tubular body 21 to slide axially to the right within the housing 19 of the female coupling to the coupled position illustrated in FIG. 4 in which the locking balls 18 are retained in the groove 17 of the male coupling by the housing of the female coupling. In the coupled position the ball 12 of the male coupling remains seated against the valve seat 13 of the male coupling to close the male coupling and also engages the conical portion 41 of the valve 39. In this position both the valve of the male coupling and the valve of the female coupling are closed. Since the conical portion 41 of the valve 39 is contoured to fit the ball 12 of the male coupling, the space between the two valve seats 13 and 26 is minimized.

Both of the valves are opened by rotating the lever 47 from the FIG. 4 position to the FIG. 7 position to rotate the cam and to force the valve assembly 39 to the left. Movement of the valve 39 of the valve assembly to the left opens a passage between the conical portion 41 thereof and the valve seat 26 and pushes the ball 12 of the male coupling to the left away from the valve seat 13 as illustrated in FIG. 7. The mechanical advantage provided by the lever 47 and cam 46 permits the valves to be opened even when hydraulic pressure is exerted against the valves. When the valves 12 and 39 are opened, fluid can flow through the couplings in either direction.

When the couplings are to be disconnected, the lever 47 is returned to its FIG. 4 position to permit the valve assembly to return to the closed position illustrated in FIG. 4 under the influence of the coil spring 42. The ball valve 12, which is resiliently biased against the valve seat 13 by the coil spring 15 in the male coupling, also returns to its closed position. It will be appreciated from FIG. 4 that when the valve members close, the hydraulic fluid which will be spilled when the couplings are disconnected is confined within the small space between the forward end of the male coupling and the shoulder 25. The couplings can be disconnected by pulling the male coupling 11 to the left, which withdraws the tubular body 21 from the housing and enables the locking balls 18 to be moved outwardly to release the male coupling.

Figure 8:
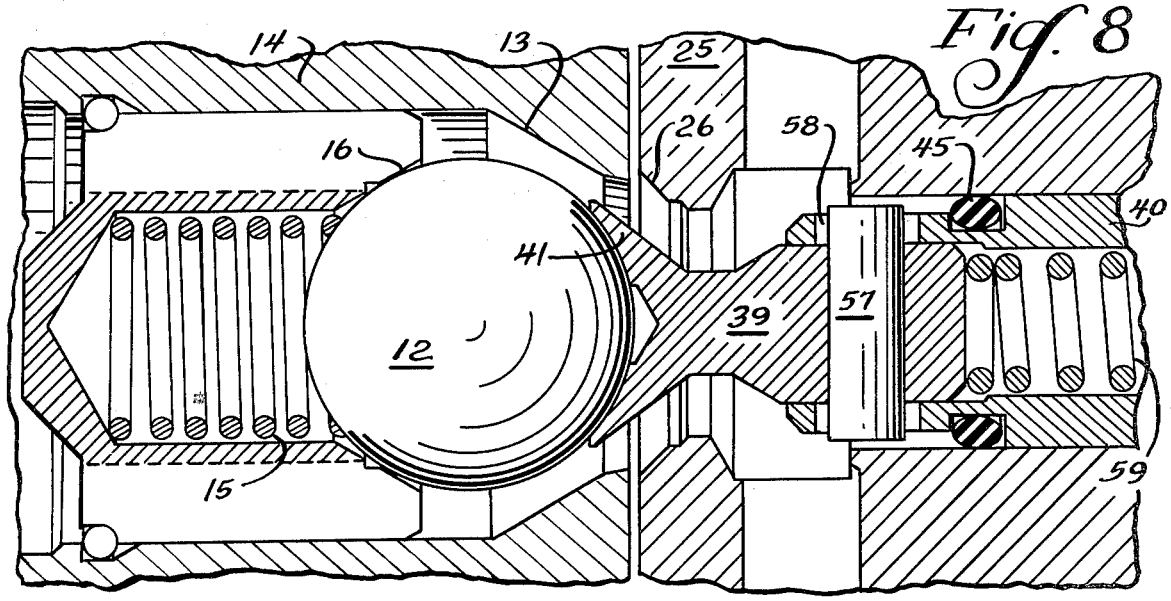
FIG. 8 is an enlarged fragmentary sectional view showing tolerance-adjusting features of the valve.

FIG. 8 illustrates the tolerance adjusting feature of the valve assembly. The valve 39 of the valve assembly is slidably mounted within the tubular actuator 40, and a pin 57 extends through the valve and into elongated slots 58 in the actuator. The pin limits the axial movement of the valve within the actuator, and the valve is urged to the left by a coil spring 59 within the actuator which is selected to have a spring force greater than the spring force of any valve closing spring 15 of the male coupling which is likely to be encountered.

As the cam 46 is rotated by the lever to force the actuator 40 and the valve 39 to the left, the spring 15 of the male coupling compresses rather than the spring 59 because of the difference in spring force. When the valve 39 has been moved to the left sufficiently to move the ball valve 12 to its fully opened position against the stop 16, further leftward movement of the actuator 40 under the influence of the cam is permitted by virtue of the slots 58 and the compression of the spring 59. The length of the slots 58 can be selected so that the valve member of the male coupling will always be fully opened regardless of the tolerances between the male coupling and the female coupling without interfering with the operation of the cam and the lever.

Comparing FIGS. 4 and 7, the upper end of the cam 46 is provided with a slot 60 which extends inwardly for about one half the diameter of the cam. This slot is aligned with an opening 61 in the plate 53, and the contour of the opening is shown in FIGS. 3 and 6. The opening has a generally circular portion 61a which has a radius corresponding generally to the radius of the cam and a slotted portion 61b which has a width corresponding to the nonslotted portion 62 (FIG. 7) of the cam. The reduced width of the slotted portion 61b of the opening is provided by a projection 63 on the plate 53 having an inclined edge 64.

When the male and female couplings are not connected, the lever 47 and the cam 46 are in the positions illustrated in FIGS. 1 and 3. The projection 63 of the plate extends into the slot 60 of the cam and prevents rotation of the lever and the cam to thereby prevent opening of the valve of the female coupling when the couplings are uncoupled.

When the male and female couplings are coupled as illustrated in FIG. 4, the tubular body 21 and the cam 46 are moved to the right to position the cam in the circular portion 61a of the opening 61 in the plate 53. The lever and the cam can then be rotated from the FIG. 5 position to the FIG. 6 position.

Figure 5:
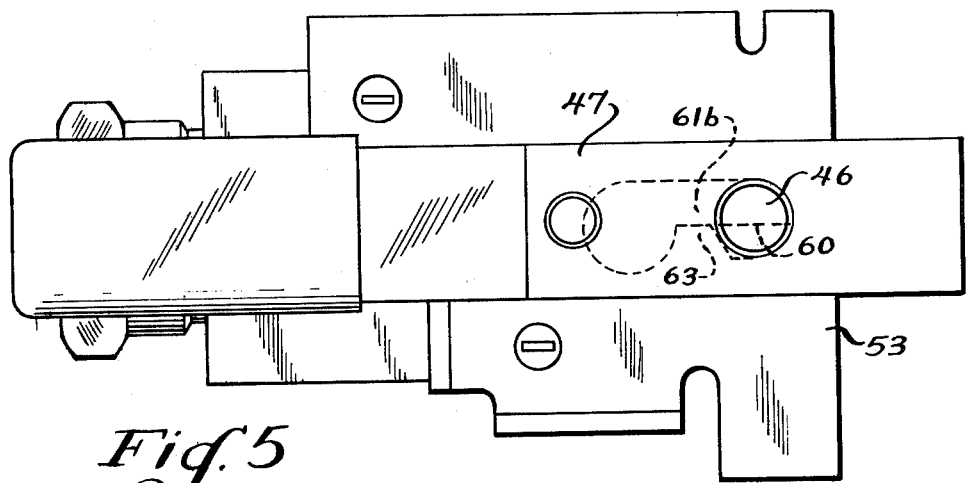
FIG. 5 is a fragmentary top view taken along the line 5—5 of FIG. 4.

If the male coupling is attempted to be uncoupled from the female coupling before the lever 47 is returned to the off position of FIGS. 4 and 5, movement of the tubular body 21 to the left as the male coupling is pulled will cause the cam to engage the inclined edge 64 of the projection 63, and the cam will be rotated to the off position before the male coupling can be uncoupled from the female coupling. The valves of the male coupling and female coupling will therefore be closed prior to the uncoupling.

Since the cam mechanism is located outside of the flow passage from the radially extending openings 27 in the tubular housing past the valves 39 and 12, the cam mechanism does not create any pressure drop. Further, the very close spacing between the two valves provides a very short flow passage which further minimizes pressure drop through the valve passages. Pressure drop is further reduced because the ball valve of the male coupling is maintained fully opened regardless of tolerance accumulation between the male coupling and the female coupling, which is compensated for by the relative movement between the valve 39 and the actuator 40. The total travel of the valve 39 from its closed position to its open position is only the length of movement which is required to fully open the ball valve of the male coupling.

While in the foregoing specification, a detailed description of the invention has been set forth for the purpose of illustration, many variations in the details hereingiven may be made by those skilled in the art without departing from the spirit and scope of the invention.

I claim:

1. A lever-type quick disconnect female coupling for coaction with a check-valve equipped male coupling, the female coupling comprising:
   (a) an outer tubular housing;
   (b) a generally tubular inner housing having
      (i) a forward end and a rearward end,
      (ii) an axially extending bore open at said forward end for receipt of said male coupling,
      (iii) a valve seat in said bore spaced rearwardly from said open forward end,
      (iv) a port extending generally transversely through the housing rearwardly of the valve seat and adjacent thereto;
   (c) a valve slidably mounted in said bore and movable between a first position in which the valve engages said valve seat and blocks fluid flow between said port and said open forward end and a second position in which the valve is moved forwardly of the valve seat to permit fluid to flow between said port and said open end, said valve being adapted to engage the check valve of the male coupling as said valve moves forwardly from its first position to its second position;
   (d) seal means in said bore between the inner housing and the valve rearwardly of the port for preventing the flow of fluid in the bore rearwardly of the seal means;
   (e) cam means mounted on the inner housing rearwardly of the seal means for moving said valve from its first position to its second position while said valve seat remains stationary; and
   (f) a lever conneted to said cam means for moving the cam means.

2. The structure of claim 1 in which said valve includes a tubular actuator portion which is slidably mounted in said bore and which is engageable by said cam means, and a valve portion which is axially slidably mounted in said tubular actuator portion, abutment means on the actuator portion of the valve portion for limiting relative axial movement between the actuator portion and the valve portion, the spring means within the actuator portion for resiliently biasing the valve portion away from said cam means.

3. The structure of claim 2 in which said tubular actuator means is provided with a pair of diametrically opposed slots, each of said slots being elongated in the axial direction of the tubular actuator portion, said abutment means comprising a pin mounted on said valve portion and extending into said slots, said pin being axially movable within said slots when a force is exerted on said valve portion sufficient to overcome the force exerted by said spring means.

4. The structure of claim 2 in which said valve portion includes a generally conical forward portion which is engageable with said valve seat.

5. The structure of claim 1 including spring means within said inner housing resiliently biasing said valve against said valve seat.

6. The structure of claim 1 including spring means for resiliently biasing the valve rearwardly into engagement with said valve seat.

7. A lever-type quick disconnect female coupling for coaction with a check-valve equipped male coupling, the female coupling comprising:
   (a) an outer tubular housing;
   (b) an inner tubular housing slidably mounted within said outer tubular housing for movement between first and second positions when the female coupling is disconnected and connected from a male coupling, said inner tubular housing having an axially extending bore open at one end for receipt of said male coupling and a port through the housing communicating with the bore;
   (c) a valve slidably mounted in said bore and movable between a first position in which said valve blocks fluid flow between said port and said open end and a second position in which the valve is moved from said first position toward said open end to permit fluid flow between said port and said open end, said valve being adapted to engage the check valve of the male coupling as said valve moves from the first position to its second position, said valve including a tubular actuator portion which is slidably mounted in said bore and a valve portion which is axially slidably mounted in said tubular actuator portion, abutment means on the actuator portion and the valve portion for limiting relative axial movement between the actuator portion and the valve portion, and spring means within the actuator portion for resiliently biasing the valve portion toward said open end of the bore;
   (d) a lever movably mounted on said housing;
   (e) a cam extending transversely through said inner tubular housing and being rotatably mounted therein, said cam being engageable with said tubular actuator portion of the valve and operable by said lever for moving said valve from its first position to its second position; and
   (f) a plate mounted on said outer tubular housing and having an axially extending opening therein, said cam extending through the opening in said plate and being movable axially between first and second portions of the opening as said inner tubular housing moves axially between its first and second positions relative to said outer tubular housing, the first portion of the opening preventing rotation of the cam when the cam and said inner tubular housing are in their first positions, the second portion of the opening permitting rotation of the cam when the cam and said inner tubular housing are in their second positions.

* * * * *

UNITED STATES PATENT AND TRADEMARK OFFICE
CERTIFICATE OF CORRECTION

PATENT NO. : 4,181,150
DATED : January 1, 1980
INVENTOR(S) : Ojars Maldavs

It is certified that error appears in the above-identified patent and that said Letters Patent are hereby corrected as shown below:

Col. 6, line 10 change "means" to --portion--.

Signed and Sealed this

Fifteenth Day of April 1980

[SEAL]

Attest:

SIDNEY A. DIAMOND

Attesting Officer     Commissioner of Patents and Trademarks